United States Patent
McLeod et al.

(10) Patent No.: US 10,943,415 B2
(45) Date of Patent: Mar. 9, 2021

(54) SYSTEM AND METHOD FOR PROVIDING COMMUNICATION OVER INDUCTIVE POWER TRANSFER TO DOOR

(71) Applicant: Sensormatic Electronics, LLC, Boca Raton, FL (US)

(72) Inventors: Murdo Jamie Scott McLeod, Belfast (GB); Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/690,763

(22) Filed: Aug. 30, 2017

(65) Prior Publication Data

US 2019/0066419 A1 Feb. 28, 2019

(51) Int. Cl.
*G07C 9/00* (2020.01)
*H04W 12/08* (2009.01)
(Continued)

(52) U.S. Cl.
CPC .......... *G07C 9/00309* (2013.01); *E05B 47/00* (2013.01); *E05B 47/0006* (2013.01);
(Continued)

(58) Field of Classification Search
CPC .. H02J 50/10; H02J 50/20; H02J 50/60; H02J 7/025; H02J 5/005; H02J 17/00; H02J 50/12; H02J 5/40; H02J 50/80; H02J 50/90; B60L 11/1801; B60L 2200/10; B64G 1/42; H04B 5/0037; H04B 5/0068; H04B 5/0081; H04B 5/02; H04B 5/0012; H04B 5/0062; H05B 33/0857; H05B 33/0896; H05B 37/0272; H05B 37/0281; F21K 9/235; F21K 9/27; F21V 21/15; F21Y 2115/10; F21Y 2115/15; A61N 2005/0626; A61N 2005/0653; A61N 5/01; A61N 5/0618; G06K 19/0701; G06K 19/0723; G06K 19/07788; G06K 7/10069; G06K 7/10326; G06K 7/10425; G06K 7/10435;
(Continued)

(56) References Cited

U.S. PATENT DOCUMENTS

| 4,682,801 A | 7/1987 | Cook et al. |
| 5,195,341 A | 3/1993 | Nieuwkoop |

(Continued)

*Primary Examiner* — Dionne Pendleton
(74) *Attorney, Agent, or Firm* — HoustonHogle LLP (57) ABSTRACT

A system and method for a door system is disclosed. The system produces an inductive power transfer signal and modulates the inductive power transfer signal. The system also encodes data within the modulated inductive power transfer signal and transmits the signal at a door frame of a door. At the door, the system receives the modulated inductive power transfer signal and extracts data from the received signal, and transduces the received signal into a door power signal. The system also supports secure data transfer by encrypting the encoded data at the door frame and decrypting the extracted data at the door. As a result, the modulated inductive power transfer signal between the door frame and the door provides a secure wireless data transfer channel for configuring components at the door and/or displaying data at the door, while also providing power to components at the door.

18 Claims, 4 Drawing Sheets

(51) Int. Cl.
  *E05B 47/00* (2006.01)
  *H02J 50/10* (2016.01)
  *E05C 19/16* (2006.01)
  *E05C 17/56* (2006.01)
  *E05B 63/00* (2006.01)
  *H04B 5/00* (2006.01)
  *G07C 9/20* (2020.01)
  *G07C 9/27* (2020.01)

(52) U.S. Cl.
  CPC ...... *E05B 47/0046* (2013.01); *E05B 63/0052* (2013.01); *E05C 17/56* (2013.01); *E05C 19/166* (2013.01); *G07C 9/00174* (2013.01); *H02J 50/10* (2016.02); *H04B 5/0031* (2013.01); *H04B 5/0037* (2013.01); *H04B 5/0081* (2013.01); *H04B 5/0087* (2013.01); *E05B 2047/0059* (2013.01); *E05B 2047/0082* (2013.01); *G07C 9/20* (2020.01); *G07C 9/27* (2020.01); *G07C 2009/00611* (2013.01); *G07C 2009/00634* (2013.01)

(58) Field of Classification Search
  CPC ........... G07C 2009/00634; G07C 2009/00777; G07C 2009/00809; G07C 9/00174; G07C 9/00309; G07C 9/0094; G07C 9/00944; G07C 9/22; G07C 9/257; G07C 9/26; G07C 9/27; G07C 209/65; G07C 9/00722; G07C 2209/65; E05B 2047/0058; E05B 2047/0061; E05B 2047/0068; E05B 2047/0082; E05B 2047/0094; E05B 47/0002; E05B 47/0001; E05B 2047/0048; H01F 2038/146; H01F 38/14; H01F 7/1811; Y02D 70/00; Y02D 70/166; Y02D 70/42; G08B 13/2417; E05C 19/166; E05C 17/56; G01S 7/4912; H04W 12/06; H04W 12/08; H01H 47/22; Y10T 292/11
  See application file for complete search history.

(56) References Cited

U.S. PATENT DOCUMENTS

| | | | |
|---|---|---|---|
| 6,282,407 B1 * | 8/2001 | Vega | G06K 7/10435 455/41.1 |
| 6,720,861 B1 | 4/2004 | Rodenbeck et al. | |
| 8,772,978 B2 | 7/2014 | Ichikawa et al. | |
| 9,845,623 B1 | 12/2017 | Gage | |
| 9,984,523 B1 | 5/2018 | Shen | |
| 10,158,831 B1 | 12/2018 | Taub | |
| 2006/0114099 A1 | 6/2006 | Deng et al. | |
| 2007/0124427 A1 | 5/2007 | Light et al. | |
| 2007/0146115 A1 | 6/2007 | Roosli et al. | |
| 2007/0198850 A1 | 8/2007 | Martin et al. | |
| 2007/0204663 A1 | 9/2007 | Lee | |
| 2008/0017726 A1 | 1/2008 | Neumann | |
| 2008/0209965 A1 | 9/2008 | Maack | |
| 2008/0218330 A1 | 9/2008 | Biles et al. | |
| 2008/0222963 A1 | 9/2008 | Zwart | |
| 2009/0302995 A1 | 12/2009 | Park | |
| 2010/0097225 A1 | 4/2010 | Petricoin, Jr. | |
| 2010/0290542 A1 | 11/2010 | Peabody et al. | |
| 2013/0167190 A1 | 6/2013 | Jankowski et al. | |
| 2013/0260676 A1 * | 10/2013 | Singh | H04B 5/0068 455/41.1 |
| 2013/0342342 A1 | 12/2013 | Sabre et al. | |
| 2014/0159388 A1 * | 6/2014 | Liao | E05C 19/166 292/251.5 |
| 2014/0265359 A1 | 9/2014 | Cheng et al. | |
| 2014/0274033 A1 | 9/2014 | Smart et al. | |
| 2014/0282048 A1 | 9/2014 | Shapiro et al. | |
| 2014/0292096 A1 * | 10/2014 | Yamada | H02J 17/00 307/104 |
| 2014/0340032 A1 * | 11/2014 | Curtis | H04B 5/0037 320/108 |
| 2015/0116082 A1 | 4/2015 | Cregg et al. | |
| 2015/0211270 A1 * | 7/2015 | Benhammou | E05C 19/166 361/156 |
| 2015/0243195 A1 | 8/2015 | Escobedo et al. | |
| 2015/0249548 A1 | 9/2015 | Rasband et al. | |
| 2015/0348220 A1 | 12/2015 | Sharma et al. | |
| 2016/0047144 A1 * | 2/2016 | McMillan | E05B 47/0002 70/263 |
| 2016/0077575 A1 | 3/2016 | Paul et al. | |
| 2016/0087687 A1 | 3/2016 | Kesler et al. | |
| 2016/0275781 A1 | 9/2016 | Nold | |
| 2016/0307683 A1 | 10/2016 | Davis et al. | |
| 2016/0343181 A1 | 11/2016 | Cheng et al. | |
| 2017/0186254 A1 | 6/2017 | Dumas et al. | |
| 2017/0228603 A1 | 8/2017 | Johnson | |
| 2017/0238401 A1 * | 8/2017 | Sadwick | F21K 9/235 315/294 |
| 2017/0243455 A1 | 8/2017 | Johnson et al. | |
| 2017/0263065 A1 | 9/2017 | Johnson | |
| 2017/0284129 A1 | 10/2017 | King | |
| 2017/0332055 A1 | 11/2017 | Henderson | |
| 2017/0373723 A1 | 12/2017 | Toivonen et al. | |
| 2018/0058099 A1 | 3/2018 | Wurm | |
| 2018/0075961 A1 * | 3/2018 | Davis | H01F 13/006 |
| 2018/0076664 A1 * | 3/2018 | Wright | B64G 5/00 |
| 2018/0213191 A1 | 7/2018 | Shen | |
| 2019/0186181 A1 * | 6/2019 | Robertson | E05C 17/56 |

* cited by examiner

SYSTEM AND METHOD FOR PROVIDING COMMUNICATION OVER INDUCTIVE POWER TRANSFER TO DOOR

RELATED APPLICATIONS

This application is related to:

U.S. application Ser. No. 15/690,743 filed on Aug. 30, 2017, entitled "System and Method for Inductive Power Transfer to Door," now U.S. Patent Publication No.: 20190063128; and U.S. application Ser. No. 15/690,770 filed on Aug. 30, 2017, entitled "Door System and Method of Operation Thereof," now U.S. Patent Publication No: 20190066413.

All of the afore-mentioned applications are incorporated herein by reference in their entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control systems, access control readers, video surveillance cameras, network video recorders (NVRs), and door control modules, to list a few examples.

Access control systems in buildings, for example, are principally concerned with physical security and the selective access to, restriction of, and/or notification of access to a place or other resource. Historically, the main components of the access control systems were access control readers and possibly door control modules and possibly door locking systems. The access control readers were often installed to enable presentation of credentials to obtain access to restricted areas, such as buildings or areas of the buildings. The readers were installed near access points, such as doors or hallways or elevators. Typically, individuals would interact with the access control readers by swiping keycards or bringing contactless smart cards within range (approximately 2-3 inches or 5 centimeters) of the reader. The access control readers would read the credential information of the keycards and validate the information possibly by reference to a verification system that confirmed the credentials and determined if the individuals were authorized to access the restricted areas. If the individuals were authorized, then the door control modules might be signaled to operate the door locking system to unlock doors, for example.

The access control readers are most often mounted to a wall next to a door frame of the door, and input power is usually provided to each of the readers via electrical cabling within the walls near each door.

The door locking systems can take a number of forms. Some include mechanical release latches on the doorframe that are directly controlled by the door control module. In other examples, the door locking systems are battery-powered and included as part of the door knob assembly. These systems are common in hotels. Magnetic lock systems are still another example.

The magnetic lock systems typically include a number of components and are often controlled by the door control module. An electromagnet typically is mounted to the door frame of the door and an armature, a ferromagnetic plate, is mounted to the door. Electrical energy supplied to the electromagnet creates a magnetic field that attracts the ferromagnetic plate with enough force to keep the door closed. When a user presents valid credentials to access reader mounted at the door, in one example, the verification system sends a signal to the door control module for the door, which in turn deenergizes the electromagnet, thus allowing the door to be opened.

SUMMARY OF THE INVENTION

There are a number of situations in which it would be desirable to have the ability to transmit information to a door. Such information could be displayed to a user. The information could also be used to control electronic systems, including components of the access control system, located on the moving door.

One solution is to transmit the information wirelessly using Bluetooth transmissions, for example. This approach is employed by some wireless door lock systems. The problem with this approach, however, is twofold. First, the wireless lock systems must be typically powered by batteries, which need to be replaced periodically. Secondly, the information must be broadcast, which makes it susceptible to being intercepted.

Another existing solution involves running physical cabling to the door. The information is then encoded and transmitted over this cabling. Typically, the wiring is located near one of the door's hinges, near the top of the door. This approach can be used to avoid the necessity of having a battery on the door. The disadvantage, however, is the expense of installation. The electrical wiring must be run through the doorframe and through the door. Moreover, this solution suffers from maintenance issues since the repeated opening and closing of the door will cause the wiring to fatigue over time.

The present invention concerns enabling communications to a door. Specifically, a magnetic lock system is augmented with an inductive power transfer system that also supports data communication. At the door frame, the system encodes data by modulating the inductive power transfer signal. At the door, the modulated inductive power transfer signal is both transduced into a power signal and demodulated to extract the data. As a result, data can be transmitted to configure and/or be displayed at components on a moving door, without the need for wired power connections nor wired communications connections.

In general, according to one aspect, the invention features a door system. The system includes an inductive power transmission module that produces an inductive power transfer signal, a modulator that modulates the inductive power transfer signal, and an inductive power transmitter mounted to a door frame that transmits the modulated inductive power transfer signal. The access control system also includes an inductive power receiver at a door that receives the modulated inductive power transfer signal, and a door power management system. The door power management system includes a demodulator that extracts data from the door modulated inductive power transfer signal, and a power conditioning circuit that converts the inductive power transfer signal into a door power signal.

Preferably, the door power management system also can include a filter that filters the door modulated inductive power transfer signal prior to the demodulator extracting the data from the door modulated inductive power transfer signal. Additionally, the door power management system includes an energy storage element that the power conditioning circuit charges with the door power signal. Typically, the energy storage element supplies power to the door when the inductive power transfer signal is interrupted.

The system can also include a door controller at the door that receives the data extracted by and sent from the demodulator and is powered by the door power signal.

Typically, the door system can also include a wireless transceiver, such as a WiFi transceiver, on the door and a door position sensor at the door. The WiFi transceiver provides data communications for the door controller, and the door position sensor at the door indicates an open and/or closed state of the door to the door controller.

Additionally, the door system can include a display at the door and a door control module at the door. The display receives the data sent from the door controller and is powered by the door power signal, wherein the display presents the data within the display to users. The door control module at the door frame provides the data to the modulator, wherein the modulator encodes the data into the modulated inductive power transfer signal.

In general, according to another aspect, the invention features a method for providing information to a door. The method includes producing an inductive power transfer signal, and modulating the inductive power transfer signal. The method also includes transmitting the modulated inductive power transfer signal at a door frame. Additionally, the method includes receiving the modulated inductive power transfer signal at a door, extracting data from the door modulated inductive power transfer signal at the door, and converting the inductive power transfer signal at the door into a door power signal.

Preferably, extracting the data from the door modulated inductive power transfer signal at the door comprises demodulating the door modulated inductive power transfer signal to obtain the data. A door controller at the door can receive the extracted data in response to demodulating the door modulated inductive power transfer signal, the door controller being powered by the door power signal. The method can additionally include providing data that is encoded into the modulated inductive power transfer signal, and presenting the data at an interactive display at the door.

The method can also include encrypting the data and encoding the encrypted data into the modulated inductive power transfer signal at the door frame, and decrypting the data after extracting the data from the door modulated inductive power transfer signal at the door.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
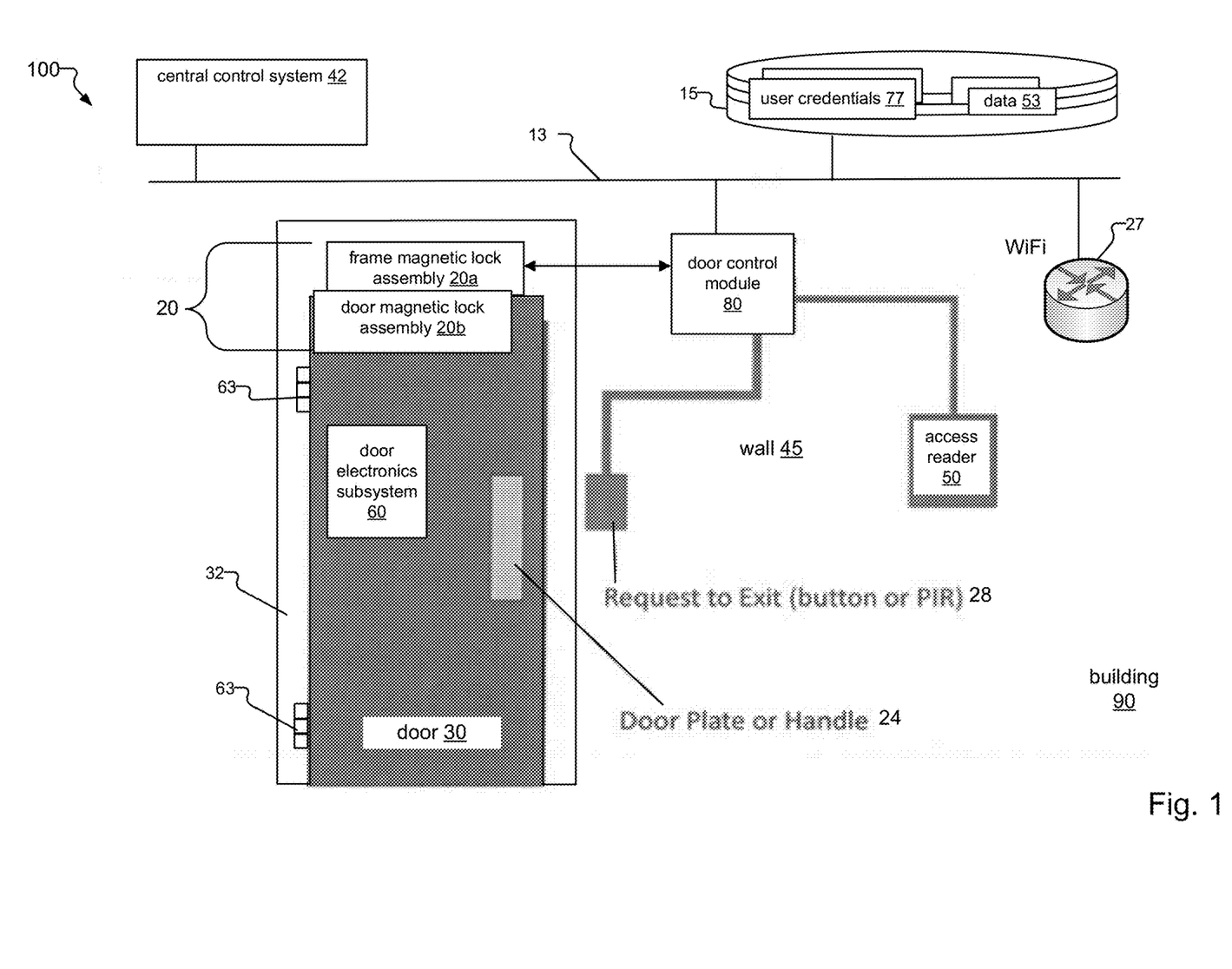
FIG. 1 is a schematic diagram showing an inventive door system showing its relationship to a magnetic lock system mounted to a door and door frame of the door, where the magnetic lock system creates a modulated inductive power transfer signal to provide communications from the door frame to the door.

FIG. 1 is a schematic diagram of a door system 100 to which the invention is directed. The system 100 is installed at a premises such as a building 90.

Major components of the system 100 include a magnetic lock system 20 mounted between a door frame 32 and a door 30, a door electronics subsystem 60 mounted to the door 30, possibly a door control module 80, possibly an access reader 50, possibly a WiFi access point 27, and possibly a central control system 42. The central control system 42, in one example, functions as a verification system for verifying user credentials 77 of users.

The door 30 is attached to the door frame 32 by hinges 63 that enable opening and closing of the door 30. The present system could also be applied to sliding doors, however. The door 30 also includes a door electronics subsystem 60 and a handle/door plate 24. In one example, the door electronics subsystem 60 and handle/door plate 24 are mounted to the door 30. In another example, a portion of the door 30 is removed to create a recess within the door 30, and the door electronics subsystem 60 is included within the recess of the door 30.

The access reader 50 is mounted to a wall 45 next to the door frame 32 of the door 30, and input power is usually provided to the access reader 50 via electrical cabling within the wall 45. The access reader 50 can also receive a signal from a request to exit device 28 mounted to the wall 45. In examples, the device 28 can be a simple button pressed by the user that sends the signal to the door control module 80, or a Passive Infra-Red (PIR) sensor that detects the presence of the user and sends the signal in response. The door control module 80, the access reader 50, and the request to exit device 28 are examples of equipment mounted near the door frame 32 of the system 100 that typically receive input power via electrical cabling within the wall 45.

The magnetic lock system 20 includes a frame magnetic lock assembly 20*a* mounted to the door frame 32 and a door magnetic lock assembly 20*b* mounted to the door 30. The frame magnetic lock assembly 20*a* receives power from the door control module 80, and the door control module 80 communicates with the central control system 42 and the WiFi access point 27 over a local network 13. A database 15 connected to the local network 13 stores user credentials 77 of users. Alternatively, in another implementation, the database 15 is directly connected to the central control system 42 rather than via the local network 13. In this implementation, the direct connection of the database 15 to the central control system 42 provides heightened data security for the user credentials 77 of the users and other information stored within the database 15.

Users at the door 30 typically present access cards including their user credentials 77 to the access reader 50 to obtain access to the premises 90. The access reader 50 sends the user credentials 77 in messages to the door control module 80, which in turn sends the user credentials to the central control system 42 for verification. Upon verification of the user credentials 77, the central control system 42 sends a signal for unlocking the door 30 to the door controller module 80. The door controller module 80, in turn, sends a signal to the frame magnetic lock assembly 20*a* to unlock the door 30 or simply cuts power to the electromagnet in the frame magnetic lock assembly.

Though only one door 30 is shown, it can be appreciated that the door control module 80 can provide power to and control the locking and unlocking of multiple doors 30 within the building 90.

The database 15 also stores data 53 for consumption and display by components at the door 30. The data 53 can be of different types, which the central control system 42 maintains, modifies, and/or creates in response to conditions within the building 90 and/or in response to users attempting to access the building 90 via the access readers 50, in examples. In one example, the data 53 includes a name of the user, telephone number, and a list of areas within the building 90 that the user is authorized to access.

Figure 2:
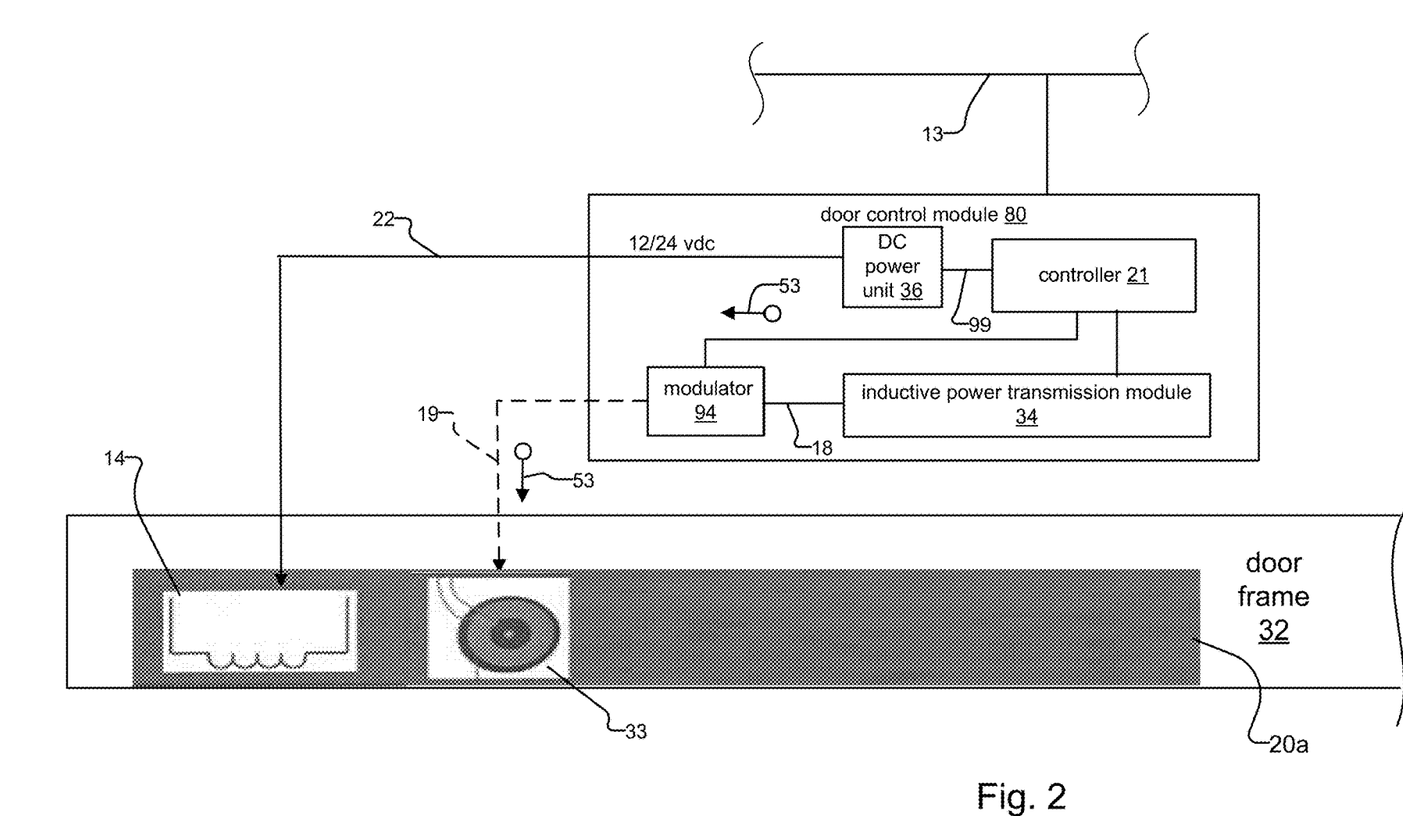
FIG. 2 shows detail for an embodiment of a frame magnetic lock assembly of the magnetic lock system in FIG. 1, and also shows components on a door frame side that interface with the frame magnetic lock assembly.

FIG. 2 shows detail for an embodiment of the frame magnetic lock assembly 20*a* of the magnetic lock system 20 in FIG. 1 and also shows components on the door frame 32 side of the magnetic lock system 20 that interface with the frame magnetic lock assembly 20*a*.

The frame magnetic lock assembly 20*a* includes a lock coil 14 and an inductive power transmitter 33. The door control module 80 includes a DC power unit 36, a controller 21, a modulator 94, and an inductive power transmission module 34. The DC power unit 36 and the modulator 94 are under control of the controller 21. In an alternative implementation, the modulator 94 is located within the frame magnetic lock assembly 20*a* rather than within the door control module 80.

The controller 21 controls the locking and unlocking of the door 30, in one example, by sending a control signal 99 to activate or deactivate the DC power unit 36. The DC power unit 36 provides a dc power signal 22 to power the lock coil 14, i.e., electromagnet. Typically, the dc power signal 22 is either 12 or 24 VDC. To lock the door 30, the controller 21 sends a control signal 99 to activate the DC power unit 36, thus enabling the dc power signal 22. The inductive power transmission module 34, which is installed on the door frame 32, then provides an alternating current (ac) inductive power transfer signal 18 to an inductive power transmitter 33. To unlock the door 30, the controller 21 sends a control signal 99 that deactivates the DC power unit 36, thus disabling the dc power signal 22 and removing power to the lock coil 14.

Under control of the controller 21, the inductive power transmission module 34 provides an alternating current (ac) inductive power transfer signal 18 to the modulator 94. The controller 21 also provides data 53 to the modulator 94. In one example, the central control system 42 downloads the data 53 from the database 15 and then sends the data 53 in an unsolicited fashion the over the network 13 to the door control module 80. Within the door control module 80, the controller 21 provides the data 53 to the modulator 94. In another example, the controller 21 can query the central control system 42 for user-specific data 53. The central control system 42 obtains the user-specific data 53 from the database 15 (or from a cache of the data 53 previously downloaded to the central control system 42) and sends the data 53 to the door control module 80. For example, in response to a user presenting his/her user credentials at an access reader 50 near a door 30, the access reader 50 sends messages to the door control module 80. The messages include the user credentials 77 of the user and includes information that identifies a number and/or location of the door 32 at which the user is attempting to obtain access, in examples. Based upon the messages, the controller 21 can then request data 53 from the central command system 42 that is specific to the user and/or door 32, in examples.

Additionally, the controller 21 of the door control module 80 can encrypt the data 53 prior to sending the data 53 to the modulator 42.

The modulator 94 then creates a modulated ac power signal 19 from both the ac inductive power transfer signal 18 and the data 53 (if provided by the controller 21). As a result, the data 53 (if present) is encoded within the modulated ac power signal 19, and the modulated ac power signal 19 is then transmitted to the inductive power transmitter 33. Because the data 53 is encoded by modulation, the data 53 is also referred to as being carried by the modulated ac power signal 19.

It is also important to note that the door control module 80 controls the transmission of the modulated ac power signal 19 independently from its control of the dc power signal 22. The modulated ac power signal 19 energizes the inductive power transmitter 33, while the dc power signal 22 energizes the lock coil 14. For example, while the dc power signal 22 can be enabled or disabled by the controller 21 at different times to lock or unlock the door 30, the modulated ac power signal 19 is typically "always on." The modulated ac power signal 19 may or may not be carrying encoded data 53, however.

Figure 3:
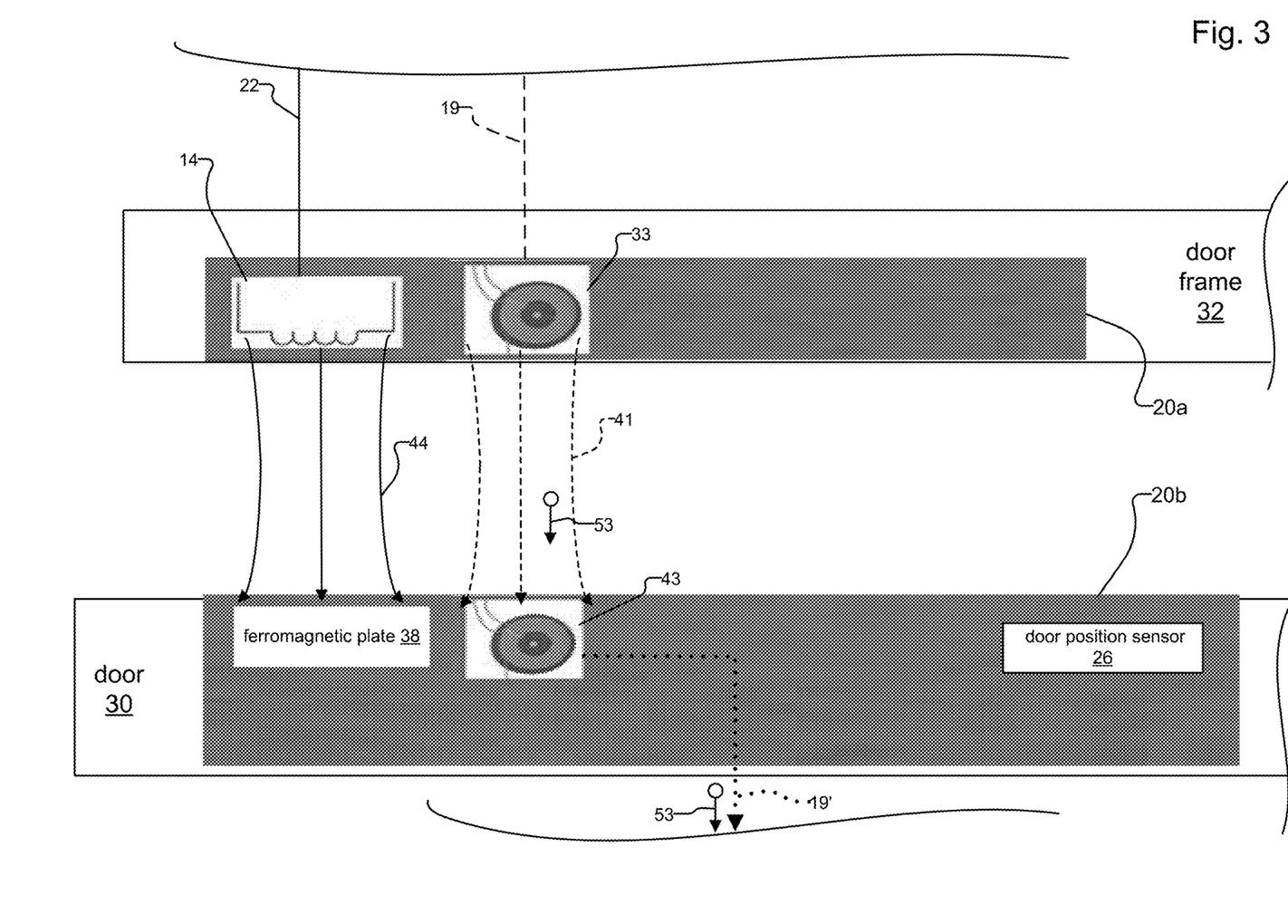
FIG. 3 shows more detail for the magnetic lock system, including interfacing and signals sent from the frame magnetic lock assembly to a door magnetic lock assembly of the magnetic lock system.

FIG. 3 shows more detail for the magnetic lock 20, including interfacing and signals between the frame magnetic lock assembly 20*a* and the door magnetic lock assembly 20*b*.

The door magnetic lock assembly 20*b* includes a ferromagnetic plate 38, an inductive power receiver 43, and a door position sensor 26. The door 30 is normally closed and locked. The dc power signal 22 energizes the lock coil 14, which in turn applies a magnetic field 44 that attracts the ferromagnetic plate 38 to lock the door.

Within the frame magnetic lock assembly 20*a*, the ac inductive power input signal 22 energizes the inductive power transmitter 33. The inductive power transmitter 33, in turn, creates a modulated inductive power transfer signal 41 in the form of a magnetic field that radiates toward the inductive power receiver 43 of the door magnetic lock assembly 20b. Through magnetic induction, the inductive power receiver 43 receives and transduces the modulated inductive power transfer signal 41 into a door modulated ac power signal 19' at the door 30. The modulated inductive power transfer signal 41 and door modulated ac power signal 19' carry the encoded data 53 for consumption and display at the door 30, when applicable.

The door magnetic lock assembly 20b no longer receives the modulated inductive power transfer signal 41 from the frame magnetic lock assembly 20a when the door 30 is open. This is because of the resulting gap between the transmitter 33 and the receiver 43.

Figure 4:
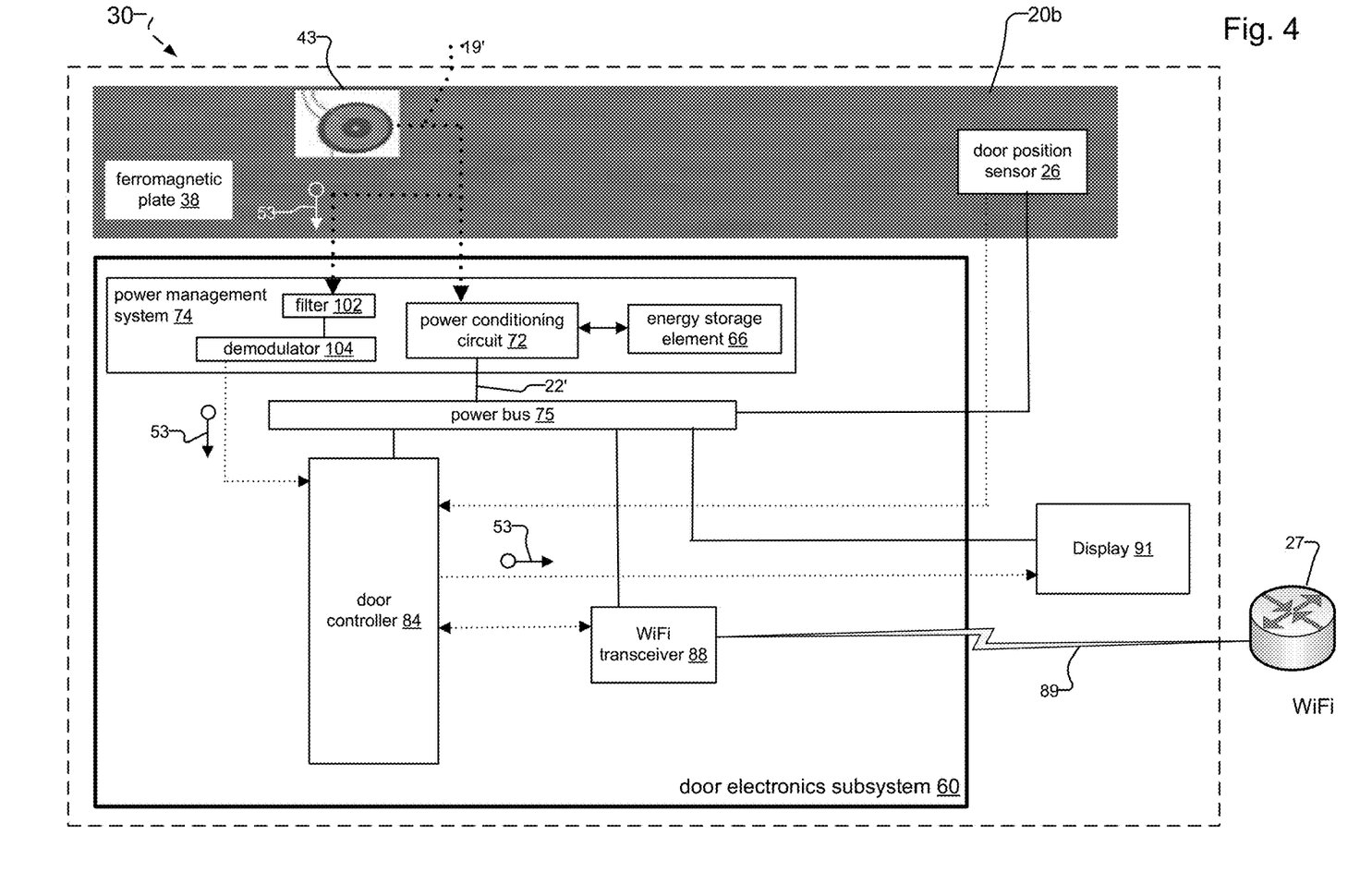
FIG. 4 shows more detail for components on the door side of the door system.

FIG. 4 shows more detail for components on the door side of the magnetic lock system 20.

The door 30 includes a door electronics subsystem 60 that is typically either mounted upon or integrated within the door 30. The door electronics subsystem 60 includes a power management system 74, a power bus 75, a door controller 84, and a WiFi transceiver 88. A display 91 is mounted to the door 30 that displays data 53 for users at the door 30.

The power management system 74 includes a power conditioning circuit 72 and an energy storage element 66. The power management system 74 also includes a filter 102 and a demodulator 104. The power conditioning circuit 72 receives the door modulated ac power signal 19' from the inductive power receiver 43. Then, the power conditioning circuit 72 converts the door modulated ac power signal 19' to a door dc power signal 22' to provide power to components at the door 30. The power conditioning circuit 72 can provide ripple reduction of the door modulated ac power signal 19' and converts (e.g. by rectification) the door modulated ac power signal 19' into the door dc power signal 22'.

The power management system 74 also extracts data 53 encoded within the door modulated ac power signal 19'. For this purpose, in one example, the filter 102 first filters the door modulated ac power signal 19' and the demodulator extracts the encoded data 53 from the door modulated ac power signal 19'.

The demodulator 104 extracts the data from the door modulated ac power signal 19' by demodulating the door modulated ac power signal 19.' As a result, the demodulator obtains the data 53 in the form sent by the controller 21 (i.e. in decoded form). The demodulator 104 then passes the data 53 to the door controller 84. The door controller 84 receives the data 53, and decrypts the data 53 if the controller 21 had encrypted the data 53 prior to sending the data 53 to the modulator 42. The ability of the magnetic lock system 20 to send data 53 over the modulated inductive power transfer signal 41 from the door frame 32 to the door 30 provides a wireless simplex communications path from the door frame 32 to the door 30.

The door dc power signal 22' provides power to the door electronics subsystem 60 and other various components at the door 30 via the power bus 75. In examples, the power bus 75 distributes the door dc power signal 22' to the door position sensor 26, the display 91, and the door controller 84 and WiFi transceiver 88 of the door electronics subsystem 60. The door controller 84 is typically a microcontroller. The power conditioning circuit 72 also charges the energy storage element 66 with the door dc power signal 22'. In examples, the energy storage element 66 is a rechargeable energy source such as a supercapacitor or a rechargeable battery.

When the door 32 is opened by a user, the power management system 74 cannot provide power to the door 32 transduced from the modulated inductive power transfer signal 41. As a user opens the door 32, the inductive power receiver 43 is no longer located near the inductive power transmitter 33, and the inductive power receiver 43 cannot receive the modulated inductive power transfer signal 41 as a result. Consequently, the door modulated ac power signal 19' is not available at the door 32. Moreover, the power management system 74 cannot receive data 53 when the door is open because the modulated inductive power transfer signal 41 carries the data 53.

However, when the door modulated ac power signal 19' is not available at the door 30, such as when the door 32 is open, the power management system 74 can provide power to the door 30 via the stored door DC power signal 22' of the energy storage element 66. The power conditioning circuit 72 of the power management system 74 provides the stored door DC power signal 22' to the power bus 75, which in turn powers the door electronics subsystem 60 and other components at the door 30 including the display 91. In this way, the power management system 74 can ride through a disconnection of the modulated inductive power transfer signal 41.

The power management system 74 also alternates between powering the door 30 via the modulated inductive power transfer signal 41 and via the stored door DC power signal 22' from the energy storage element 66, based on the availability of the modulated inductive power transfer signal 41 at the door 30. The power management system 74 can then switch back to providing power to the door 30 from the door modulated ac power signal 19' when the modulated inductive power transfer signal 41 at the door 30 is restored.

In any event, when the modulated inductive power transfer signal 41/door modulated ac power signal 19' is restored, the power conditioning circuit 72 uses some of the input power to recharge the energy storage element 66 so that it is fully charged for the next time the door 30 is opened. The remaining power from the door modulated ac power signal 19' is used to provide power on the power bus 75 and to the other components of the door electronics subsystem 60.

The door controller 84 receives an indication that the door 30 is open and/or closed from the door position sensor 26 and controls the WiFi transceiver 88. The door controller 84 also receives data 53 extracted from the door modulated ac power signal 19' by the demodulator 104.

The WiFi transceiver 88 establishes a WiFi link 89 to the WiFi access point 27, which in turn communicates with the door control module 80 at the door frame 32 via the local network 13. In this way, the door controller 84 at the door 32 can provide a response to the door control module 80 that sent the data 53 by sending messages over the WiFi link 89 back to the door control module 80. This enables bidirectional communications between the door frame 32 and the door 30.

After the door controller 84 receives the data 53 from the demodulator 104 (and possibly decrypts the data 53), the door controller 84 sends the data 53 to the display 91 directly, in one example. The display 91 then presents the data 53 to the user. In another example, the data 53 includes a string of commands for execution by the door controller 84. The door controller 84 then executes the commands to configure and/or enable or disable various components at the door 30 which are under control of the door controller 84.

An example that illustrates the bidirectional communications that the system 100 provides between the door frame 32 and the door 30 is described herein below.

During an emergency such as a fire, the door control module 80 obtains data 53 from the central control system 42 concerning the fire. The data 53 includes locations/areas within the building 90 that are blocked due to the fire or include smoke, and information that provides exit path(s) within the building, in examples. The controller 21 of the door control module 80 sends the data 53 to the modulator 94, and the frame magnetic lock assembly 20 creates a modulated inductive power transfer signal 41 that carries the data 53. Through magnetic induction, the door magnetic lock assembly 20 receives the modulated inductive power transfer signal 41, and the power management system 74 of the door electronics subsystem 60 extracts the data 53. The power management system 74 sends the data 53 to the door controller 84. The door controller 84 then sends the data 53 to the display 91.

The door controller 84 can then send an acknowledgment message back to the door control module 80 over the WiFi link 89. For this purpose, in one example, the door controller 84 creates a message that includes the number and/or location of the door 30 and specifies the door control module 80 as the destination of the message. The door controller 84 sends the message to the WiFi transceiver 88, which in turn sends the message over the WiFi link 89. The door control module 80 receives the message over the local network 13.

Yet another example that illustrates the bidirectional communications that the system 100 provides between the door frame 32 and the door 30 is a "firmware update" of components at the door 30. For this purpose, the data 53 includes message segments of a new firmware image, such as for the door controller 84. In response to extracting the data 53 (and optionally decrypting the extracted data 53, if applicable), the door controller 84 sends an acknowledgment message over the WiFi link 89, ultimately back to the door control module 80. The door control module 80 then sends the next segment of the firmware image as the data 53, and this process repeats until the last message sent/End Of Frame (EOF) marker of the firmware image within the data 53 is received at the door controller 84. The door controller 84 then reboots to load the new firmware image. As a result, the door system 100 supports field upgrades of components at the door 30 having updatable firmware/software images, without the need for a technician to be physically present at the door 30.

While this invention has been particularly shown and described with references to preferred embodiments thereof, it will be understood by those skilled in the art that various changes in form and details may be made therein without departing from the scope of the invention encompassed by the appended claims.

What is claimed is:

1. A door system, comprising:
   a door magnetic lock assembly mounted to a door and including a ferromagnetic plate;
   a frame magnetic lock assembly mounted to a door frame of the door and including a lock coil that attracts the ferromagnetic plate to lock the door;
   a modulator that modulates an inductive power transfer signal to produce a modulated inductive power transfer signal;
   a door control module at the door frame that provides the data to the modulator, wherein the modulator encodes the data into the modulated inductive power transfer signal;
   an inductive power transmitter mounted in the frame magnetic lock assembly that transmits the modulated inductive power transfer signal;
   an inductive power receiver in the door magnetic lock assembly that receives and transduces the modulated inductive power transfer signal into a door modulated power signal, with the inductive power receiver being moved away from the inductive power transmitter when the door is opened with the inductive power receiver then no longer receiving the modulated inductive power transfer signal from the inductive power transmitter;
   a door power management system, including:
      a demodulator that extracts data from the door modulated power signal,
      a power conditioning circuit that converts the door modulated power signal into a door power signal,
      a filter that filters the door modulated power signal prior to the demodulator extracting the data from the door modulated power signal and prior to converting the door modulated power signal into the door power signal, and
      an energy storage element that the power conditioning circuit charges with the door power signal;
   a power bus that receives power from the power conditioning circuit as the door power signal;
   a microcontroller on the door that is powered by the power bus;
   a WiFi transceiver on the door that provides data communications for the microcontroller; and
   a display at the door that receives the data sent from the microcontroller and is powered by the door power signal via the power bus, wherein the display presents the data within the display.

2. A door system, comprising:
   a door magnetic lock assembly mounted to a door and including a ferromagnetic plate;
   a frame magnetic lock assembly mounted to a door frame of the door and including a lock coil that attracts the ferromagnetic plate to lock the door;
   a modulator that modulates an inductive power transfer signal to produce a modulated inductive power transfer signal;
   an inductive power transmitter mounted in the frame magnetic lock assembly that transmits the modulated inductive power transfer signal;
   an inductive power receiver in the door magnetic lock assembly that receives and transduces the modulated inductive power transfer signal into a door modulated power signal, with the inductive power receiver being moved away from the inductive power transmitter when the door is opened with the inductive power receiver then no longer receiving the modulated inductive power transfer signal from the inductive power transmitter; and
   a door power management system, including:
      a demodulator that extracts data from the door modulated power signal;
      a power conditioning circuit that converts the door modulated power signal into a door power signal;
      a filter that filters the door modulated power signal prior to the demodulator extracting the data from the door modulated power signal and prior to converting the door modulated power signal into the door power signal; and
      an energy storage element that the power conditioning circuit charges with the door power signal.

3. The system of claim 2, wherein the energy storage element supplies power to the door when the inductive power transfer signal is interrupted.

4. The system of claim 2, further comprising a door controller at the door that receives the data extracted by and sent from the demodulator and is powered by the door power signal.

5. The system of claim 4, further comprising a WiFi transceiver on the door that provides data communications for the door controller.

6. The system of claim 4, further comprising a door position sensor at the door indicating an open and/or closed state of the door to the door controller.

7. The system of claim 4, further comprising a display at the door that receives the data sent from the door controller and is powered by the door power signal, wherein the display presents the data within the display.

8. The system of claim 2, further comprising a door control module at the door frame that provides the data to the modulator, wherein the modulator encodes the data into the modulated inductive power transfer signal.

9. A method for providing information to a door, the method comprising:
    mounting a door magnetic lock assembly, the door magnetic lock assembly including a ferromagnetic plate;
    mounting a frame magnetic lock assembly a door frame of the door, the frame magnetic lock assembly including a lock coil that attracts the ferromagnetic plate to lock the door;
    producing an inductive power transfer signal;
    modulating the inductive power transfer signal to produce a modulated inductive power transfer signal;
    transmitting the modulated inductive power transfer signal at the frame magnetic lock assembly;
    receiving the modulated inductive power transfer signal at the door magnetic lock assembly and transducing the modulated inductive power transfer signal into a door modulated power signal;
    no longer receiving the modulated inductive power transfer signal at the door when the door is opened;
    extracting data from the door modulated power signal at the door;
    filtering the door modulated power signal at the door prior to extracting the data from the door modulated power signal and prior to converting the door modulated power signal into door power signal;
    converting the door modulated power signal at the door into the door power signal; and
    charging an energy storage element at the door with the door power signal.

10. The method of claim 9, wherein extracting the data from the door modulated power signal at the door comprises demodulating the door modulated power signal to obtain the data.

11. The method of claim 9, further comprising the energy storage element supplying power when the inductive power transfer signal is interrupted.

12. The method of claim 9, further comprising a door controller at the door receiving the extracted data in response to demodulating the door modulated inductive power transfer signal, the door controller being powered by the door power signal.

13. The method of claim 12, further comprising a WiFi transceiver on the door providing data communications for the door controller.

14. The method of claim 12, further comprising a door position sensor at the door indicating an open and/or closed state of the door to the door controller.

15. The method of claim 9, further comprising providing data that is encoded into the modulated inductive power transfer signal.

16. The method of claim 9, further comprising presenting the data at a display at the door.

17. The method of claim 9, further comprising encrypting the data and encoding the encrypted data into the modulated inductive power transfer signal at the door frame.

18. The method of claim 9, further comprising decrypting the data after extracting the data from the door modulated inductive power transfer signal at the door.

* * * * *